(12) United States Patent
Tanaka et al.

(10) Patent No.: US 7,268,492 B2
(45) Date of Patent: Sep. 11, 2007

(54) PLASMA DISPLAY DEVICE WITH GREEN EMITTING PHOSPHOR THAT BECOMES POSITIVELY CHARGED

(75) Inventors: Yoshinori Tanaka, Hirakata (JP); Masaki Aoki, Mino (JP); Kazuhiko Sugimoto, Kyoto (JP); Yuichiro Miyamae, Takatsuki (JP); Junichi Hibino, Kyoto (JP); Hiroshi Setoguchi, Takatsuki (JP); Keiji Horikawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 239 days.

(21) Appl. No.: 10/534,398

(22) PCT Filed: Jun. 29, 2004

(86) PCT No.: PCT/JP2004/009483

§ 371 (c)(1),
(2), (4) Date: May 10, 2005

(87) PCT Pub. No.: WO2005/001873

PCT Pub. Date: Jan. 6, 2005

(65) Prior Publication Data

US 2006/0017385 A1 Jan. 26, 2006

(30) Foreign Application Priority Data

Jun. 30, 2003 (JP) .............................. 2003-186837

(51) Int. Cl.
*H01J 17/49* (2006.01)
*H01J 1/62* (2006.01)
*C09K 11/08* (2006.01)

(52) U.S. Cl. ................ 313/582; 313/485; 252/301.4 R

(58) Field of Classification Search ........ 313/485–487, 313/582–587; 252/301.4 R
See application file for complete search history.

(56) References Cited

U.S. PATENT DOCUMENTS 7,037,445 B2 * 5/2006 Nukuta et al. ........ 252/301.4 R

FOREIGN PATENT DOCUMENTS

| JP | 2753138 B2 | 2/1998 |
|----|-----------|--------|
| JP | 2786329 B2 | 5/1998 |
| JP | 11-199867 A | 7/1999 |

(Continued)

OTHER PUBLICATIONS

"O plus E", pp. 98-100, by Junro Koike, Special Issue: Color Plasma Display Technology, Fluorescent Material for Color Plasma Display, Nippon Hoso Kyokai Technical Institute For Broadcast, Feb. 1996, No. 195).

(Continued)

*Primary Examiner*—Joseph Williams
(74) *Attorney, Agent, or Firm*—RatnerPrestia

(57) ABSTRACT

A plasma display device provided with a green color phosphor which is charged entirely with a positive potential, adsorbs only limited amounts of water, carbon monoxide, carbon dioxide and hydrocarbon, and not liable to cause chemical reaction thereto. The green color phosphor used is a combination of any of phosphors defined by the general formula of $MMg_{1-x}Al_{11}O_{19}:Mn_x$ (where "M" denotes one of La and Ce) having a magnetoplumbite crystal structure, yttrium borate group and yttrium aluminate group phosphors defined by the general formulae of $(Y_{1-a-y}Gd_a)BO_3:Tb_y$, $(Y_{1-a-y}Gd_a)(Ga_{1-x}Al_x)_3(BO_3)_4:Tb_y$, $(Y_{1-a-y}Gd_a)(Ga_{1-x}Al_x)_3(BO_3)_4:Ce_y$, $Tb_y$, $(Y_{1-y})_3(Ga_{1-x}Al_x)_5O_{12}:Tb_y$ and $LaMg_{1-x}Al_{11}O_{19}:Ce_x$, $Tb_x$.

6 Claims, 4 Drawing Sheets

FOREIGN PATENT DOCUMENTS

| | | |
|---|---|---|
| JP | 2000-297280 A | 10/2000 |
| JP | 2001-172626 A | 6/2001 |
| JP | 2001-236893 A | 8/2001 |
| JP | 2001-335777 A | 12/2001 |
| JP | 2002-279907 A | 9/2002 |
| JP | 2003-007215 A | 1/2003 |
| JP | 2003-096448 A | 4/2003 |
| JP | 2003-142005 A | 5/2003 |

OTHER PUBLICATIONS

"Phosphor Handbook", pp. 219-220, published from Ohm Co., Ltd.
International Search Report for PCT/JP2004/009483, dated. Oct. 12, 2004.

* cited by examiner

PLASMA DISPLAY DEVICE WITH GREEN EMITTING PHOSPHOR THAT BECOMES POSITIVELY CHARGED

THIS APPLICATION IS A U.S. NATIONAL PHASE APPLICATION OF PCT INTERNATIONAL APPLICATION PCT/JP2004/009483.

TECHNICAL FIELD

The present invention relates to a plasma display device used for displaying images such as a television receiver and the like.

BACKGROUND ART

Among color display devices used for image display such as computers and televisions, certain display devices equipped with plasma display panels (hereinafter referred to as "PDP" or "panel") are drawing attention in recent years as color display devices for providing large screens while maintaining thin forms and light weights.

PDP presents full color display through the process of mixing the so-called three primary colors (i.e., red, green and blue). In order to make full color display, the PDP is provided with phosphor layers for luminous emission of the three individual primary colors of red (R), green (G) and blue (B), wherein phosphor particles composing the phosphor layers produce visible light of the individual colors when excited by ultraviolet rays generated inside discharge cells of the PDP.

Chemical compounds such as $(Y, Gd)BO_3:Eu^{3+}$ and $Y_2O_3:Eu^{3+}$ which emit red light and become charged positively (+), $Zn_2SiO_4:Mn^{2+}$ which emits green light and becomes charged negatively (−), $BaMgAl_{10}O_{17}:Eu^{2+}$ which emits blue light and becomes charged positively (+), and the like compounds are used as phosphors of the individual colors, as they are disclosed in "O plus E" (February, 1996, No. 195, pp 99-100) and the like non-patent publications, for instance.

In addition, "Phosphor Handbook" (Ohmsha, Ltd., pages 219-220) and other non-patent publications disclose a technique in which each of these phosphors is made by the process of mixing certain raw materials and firing them at a temperature of 1000 deg-C. or higher to cause a solid phase reaction.

In a combination of the conventional phosphors of red, green and blue colors, only the green phosphor is charged negative, and this tends to cause discharge failures because an amount of electric charge carried in the green phosphor differs greatly as compared to those of the red and blue colors. Therefore, another technique is disclosed in Japanese Patent Unexamined Publication, No. 2001-236893, in which $YBO_3:Tb$ having positive charge (+) is mixed with $Zn_2SiO_4:Mn$ to bring the amount of electric charge as close as possible to those of the red and blue colors, and to avoid discharge failures.

There is also another technique disclosed in Japanese Patent Unexamined Publication, No. 2003-7215, in which a discharging characteristic and brightness degradation are improved by using a mixture of $BaAl_{12}O_{19}:Mn$ or $BaMgAl_{14}O_{23}:Mn$ having a positive charge (+) and $(Y, Gd)BO_3:Tb$ or $LaPO_4:Tb$, also having a positive charge (+).

However, there exists a problem with the green phosphor, in particular, as described below when producing a PDP of high grightness by increasing a density of Xe gas inside the PDP with any mixture of the prior art phosphor materials.

A panel made of $BaMgAl_{10}O_{17}:Eu$ for the blue color, $Zn_2SiO_4:Mn$ for the green color and a mixture of $(Y, Gd)BO_3:Eu$ and $Y_2O_3:Eu$ for the red color carries positive charges (+) on the surfaces of the blue phosphor and the red phosphor among all these phosphors. However, since the green phosphor made of $Zn_2SiO_4:Mn$ has a larger ratio of $SiO_2$ in proportion to $ZnO$ (i.e., $1.5ZnO/SiO_2$) than a stoichiometric ratio ($2.ZnO/SiO_2$) for the reason attributed to manufacturing of the phosphor, a surface of $Zn_2SiO_4:Mn$ crystal is covered with $SiO_2$, and the phosphor surface is thus charged negative (−). In the PDP having both the phosphors charged negative (−) and positive (+) in coexistence, there generally is a problem that the negative charge remains only on the negatively charged phosphor, especially when the entire screen is put out after having been lit into a full luminance while the panel is driven, and this causes discharge failures such as instability and absence of discharge when the voltage is impressed for the subsequent image display. It has been found that these problems become exceptionally noticeable when the amount of Xe in the discharge gases is increased to 5% or more in an attempt to improve the brightness and efficiency of the PDP.

Furthermore, $Zn_2 SiO_4:Mn$ used for the green color remains in such a state that it is very liable to adsorb gases, especially because its surface is covered with $SiO_2$. In other words, $Zn_2 SiO_4:Mn$ has adsorbed a large amount of moisture ($H_2O$), carbon monoxide ($CO$), carbon dioxide ($CO_2$), and/or hydrocarbon gases ($C_xH_y$) left as byproducts of the decomposed organic binder. They are gasified and released inside the panel during the aging process after the panel is sealed, and they result in degradation of the discharging characteristic when they are adsorbed in the surface of MgO. Moreover, these gases are adsorbed in the surfaces of the blue color phosphor of $Ba Mg Al_{10}O_{17}:Eu$ and the green color phosphor of $Zn_2SiO_4:Mn$, and cause surface reactions. As a result, there becomes a problem that brightness decreases and a y-value of chromaticity rises in the blue color, thereby decreasing a color temperature and causing blur in color of the panel.

On the other hand, there is a panel so contrived as to have a combination of green phosphors composed of $Zn_2 SiO_4:Mn$ having a surface of negative charge and $ReBO_3:Tb$ ("Re" represents a rare earth element such as Sc, Y, La, Ce and Gd) having a surface of positive charge, which are mixed in a manner that they are charged virtually positive (+), blue phosphor of $BaMgAl_{10}O_{17}:Eu$ and red phosphor of $(Y, Gd)BO_3:Eu$, both having positive charges. In the panel of this example, although there is an improvement to some extent of the discharge failures due to unbalance of the electric charges, it still increases the discharge failures when the density of Xe gas is raised.

In addition, this example causes deterioration of MgO due to $H_2O$, $CO$, $CO_2$ and $C_xH_y$ gases released inside the panel during discharging operation as described above, and lowers the discharging characteristic including variations and failures of the discharge, since it contains $Zn_2 SiO_4$ which is liable to adsorb $H_2O$ and $C_xH_y$ gases. It also has a problem of degrading the brightness and causing blur in the color attributable to surface reaction of these gases with the phosphors of $BaMgAl_{10}O_{17}:Eu$ and $Zn_2 SiO_4:Mn$.

The discharge failures can be prevented to some extent if all the phosphors are composed of the materials having positive charges (+), such that the panel employs a combination of green phosphor made of a mixture of any of $BaAl_{12}O_{17}:Mn$, $BaMgAl_{10}O_{17}:Mn$, $(Y, Gd) BO_3:Tb$ and $LaPO_4:Tb$, all having positive charges (+), in place of the $Zn_2SiO_4$ of negative charge (−), blue phosphor of $BaMgAl_{10}O_{17}$:Eu, and red phosphor of any of (Y, Gd)$BO_3$:Eu and $Y_2O_3$:Eu.

However, this gives rise to another problem that failures and variations of discharge increase since the discharge voltage rises if the amount of Xe in the discharge gases exceeds 5% (or, especially when it exceeds 10%). Besides the degradation of these discharge characteristics, $BaAl_{12}O_{19}$:Mn and $BaMgAl_{14}O_{23}$:Mn, in particular, contain many defects within their crystal structures among the above green phosphors, and they are therefore liable to adsorb $H_2O$ and $C_xH_y$ gases. In addition, $LaPO_4$:Tb is also liable to adsorb $H_2O$ and $C_xH_y$ gases because it contains $PO_4$ in the crystal structure. For this reason, $H_2O$ and $C_xH_y$ gases are released inside the panel during the aging process, and these gases cause chemical reactions over the surfaces of the phosphors, thereby accelerating degradation of the brightness during an extended period of lighting operation of the panel. Degradation of the brightness in the blue and green colors lowers a color temperature when the panel is lit for the full-on white screen, and this gives rise to still another problem in which the color of the panel blurs so that the screen becomes yellowish.

The present invention was contrived in consideration of the above problems, and it is an object of this invention to provide a plasma display device comprised of a green phosphor which is charged entirely with a positive potential (+), lessens adsorption of $H_2O$, CO, $CO_2$ and $C_xH_y$ gases, and reduces reactions to them.

SUMMARY OF THE INVENTION

In order to achieve the above object, the present invention provides a green phosphor layer formed of a green color phosphor comprising a chemical compound given by a general formula of $MMg_{1-x}Al_{11}O_{19}$:$Mn_x$ (where "M" denotes one of La and Ce). In other words, the green phosphor used here as the material featuring high brightness, carrying positive charge (+) and not being liable to react with water and hydrocarbon gases is any one or a combination of two or more kinds of phosphors among those defined by the general formula of $MMg_{1-x}Al_{11}O_{19}$:$Mn_x$ (where "M" denotes one of La and Ce), a compound having a magnetoplumbite crystal structure, and yttrium borate or yttrium aluminate compounds defined by the general formulae of $(Y_{1-a-y}Gd_a)BO_3$:$Tb_y$, $(Y_{1-a-y}Gd_a)(Ga_{1-x}Al_x)_3(BO_3)_4$:$Tb_y$, $(Y_{1-a-y}Gd_a)(Ga_{1-x}Al_x)_3(BO_3)_4$:$Ce_y$, $Tb_y$, $(Y_{1-y})_3(Ga_{1-x}Al_x)_5O_{12}$:$Tb_y$, and $LaMg_{1-x}Al_{11}O_{19}$:$Ce_x$, $Tb_x$.

According to the above composition, amounts of electric charges carried on all of the phosphors become generally equal since all the phosphors are charged with positive potential (+), and this practically eliminates variation of discharges among the red, green and blue phosphors during address discharge, thereby avoiding discharge failures. In addition, these green phosphors are made of materials having high coefficient of electron emission, such as Al and Y, and comprised of the host material of oxide compounds featuring low absorption of water and hydrocarbon gases. They therefore do not cause significant increase in the discharge voltage even if the panel contains 5% or more in the amount of Xe gas, and they can further reduce discharge failures without increasing the voltage for address discharge even when a partial pressure of the Xe gas is raised.

DETAILED DESCRIPTION OF PREFERRED EMBODIMENTS

Description will be provided hereinafter of a plasma display device according to an exemplary embodiment of the present invention with reference to the accompanying drawings.

Figure 1:
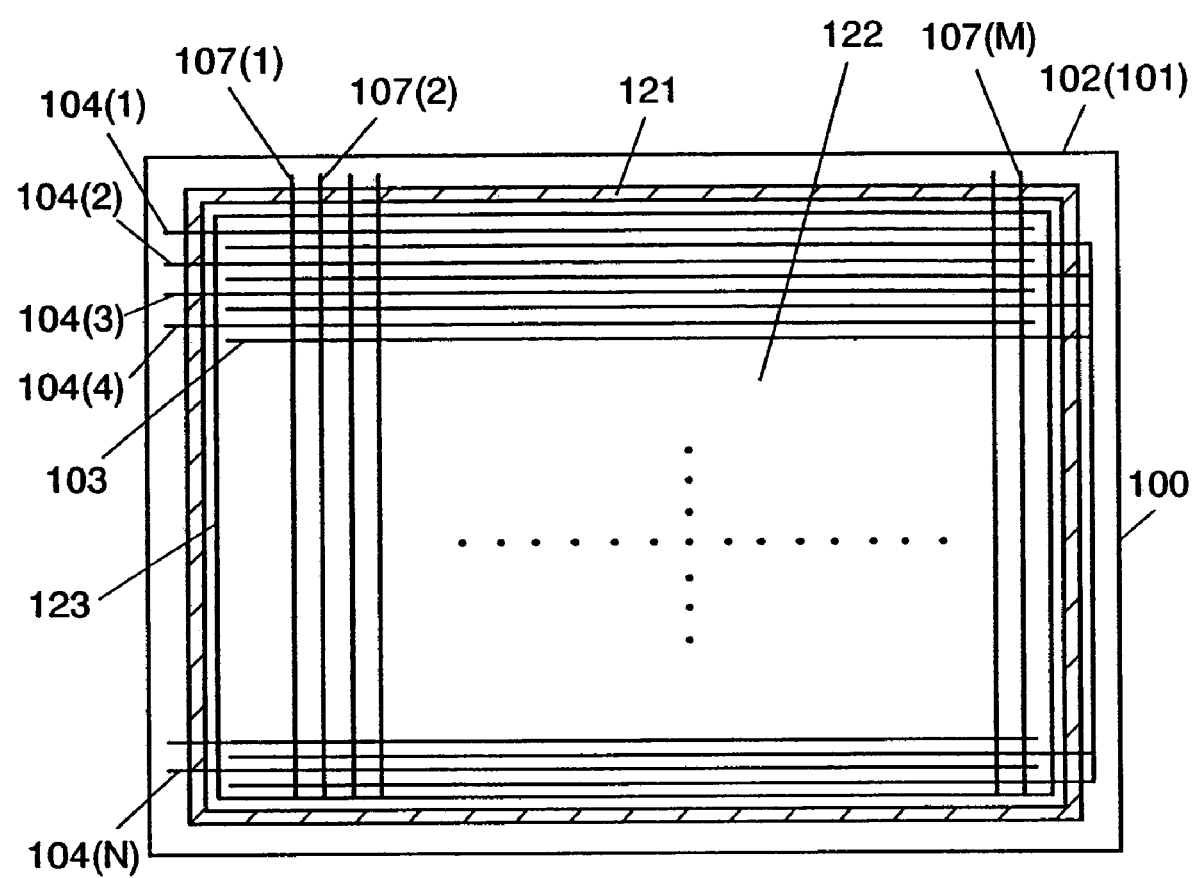
FIG. 1 is a plan view depicting a PDP for use in a plasma display device with a front glass substrate removed, according to an exemplary embodiment of the present invention.
Figure 2:
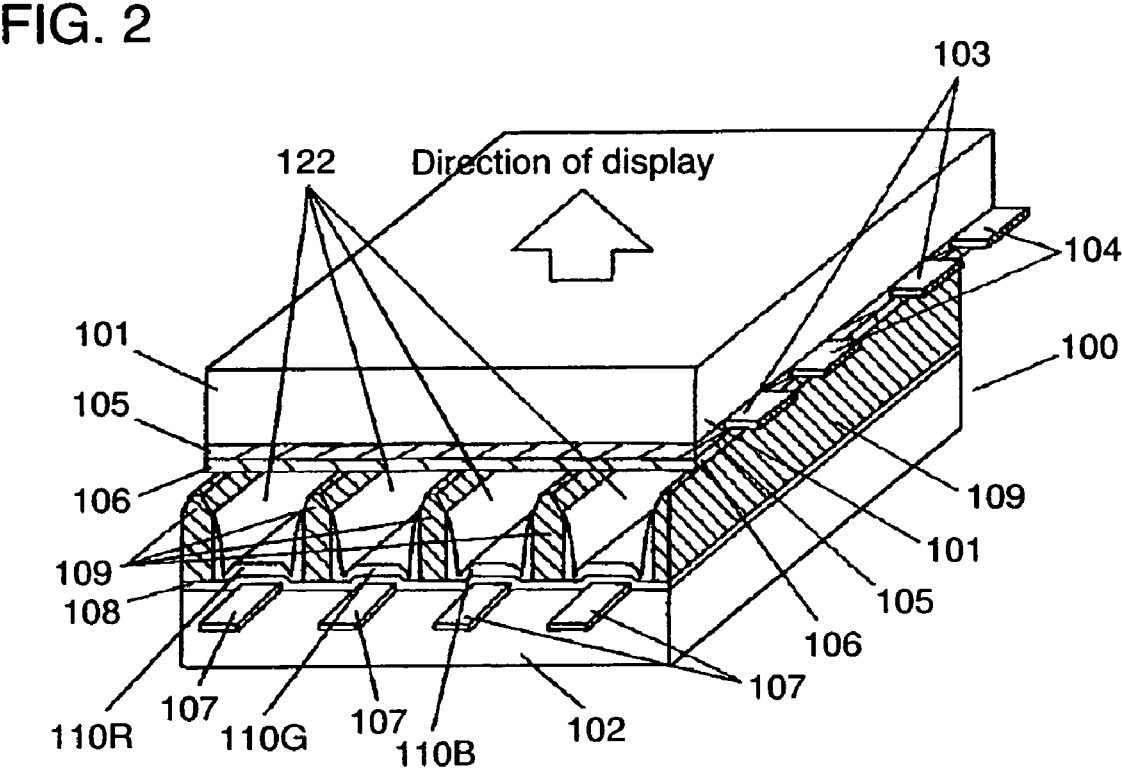
FIG. 2 is a perspective view depicting a structure of an image display area of the PDP.

FIG. 1 is a plan view depicting a PDP used for the plasma display device with its front glass substrate removed, according to this exemplary embodiment of the invention, and FIG. 2 is a perspective view depicting a structure of an image display area of the PDP. In FIG. 1, some of electrodes among groups of display electrodes, display scan electrodes and address electrodes are intentionally not shown in order to make them simple and intelligible.

As shown in FIG. 1, PDP 100 comprises front glass substrate 101 and rear glass substrate 102. Front glass substrate 101 has "N" rows each of display electrodes 103 and display scan electrodes 104 formed thereon, and rear glass substrate 102 has "M" columns of address electrodes 107 formed thereon (where "N" represents an integral number indicating a sequential position of the row, and "M" represents another integral number, indicating a sequential position of the column). Front glass substrate 101 and rear glass substrate 102 are sealed with hermetic seal layer 121 shown by slant lines. Individual electrodes 103, 104 and 107 compose a triple-electrode matrix structure, and cells are formed at intersections between display scan electrodes 104 and address electrodes 107. Front glass substrate 101 and rear glass substrate 102 form discharge space 122 between them to provide display area 123.

This PDP 100 has a structure, as shown in FIG. 2, which comprises a front panel provided with display electrodes 103, display scan electrodes 104, dielectric glass layer 105 and MgO protective layer 106 on a major surface of front glass substrate 101, a rear panel provided with address electrodes 107, dielectric glass layer 108, barrier ribs 109, phosphor layers 110R, 110G and 110B on a major surface of rear glass substrate 102, and discharge gases filled inside discharge space 122 formed between the sealed front and rear panels. PDP 100 is connected with PDP drive unit 150 shown in FIG. 3, to complete the plasma display device.

Figure 3:
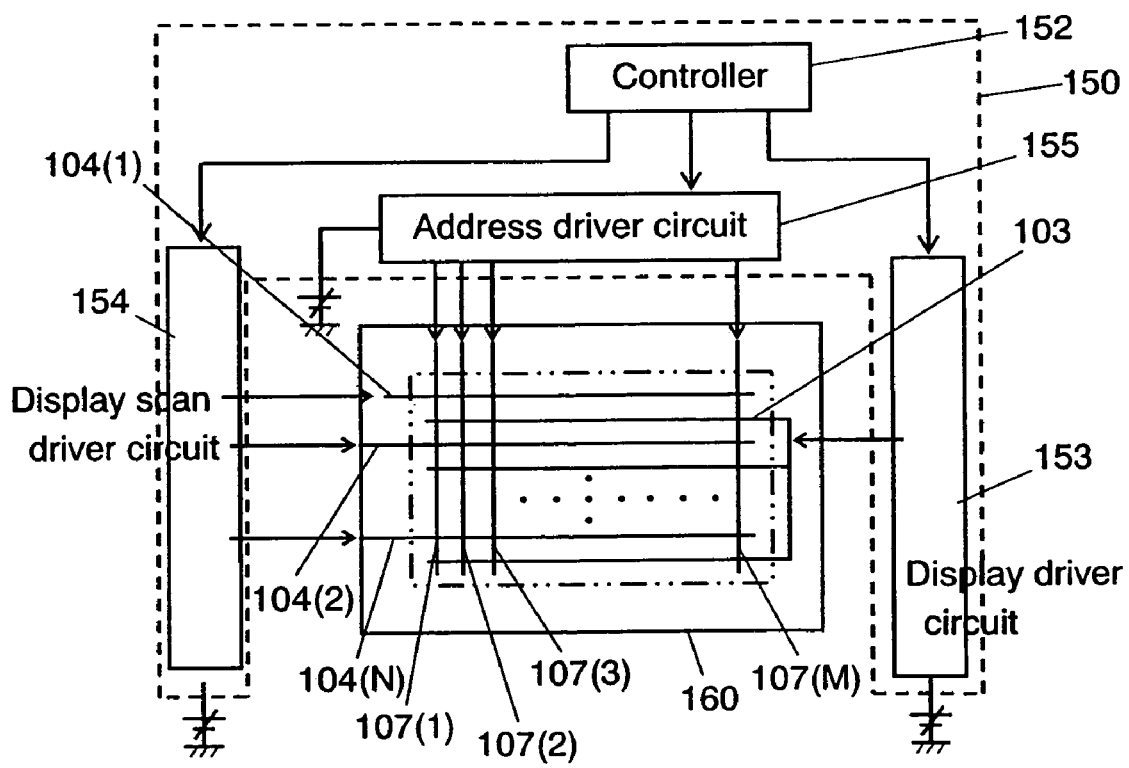
FIG. 3 is a block diagram of the plasma display device according to the exemplary embodiment of this invention.

The individual electrodes of PDP 100 are connected with display driver circuit 153, display scan driver circuit 154 and address driver circuit 155, as shown in FIG. 3, to operate the plasma display device. A voltage is applied between display scan electrode 104 and address electrode 107 to initiate an address discharge in a cell where luminous emission is to be made, under the operation of controller 152. Following the above, a pulse voltage is applied between display electrode 103 and display scan electrode 104 to obtain a self-sustained discharge. The self-sustained discharge generates ultraviolet rays in the cell, which in turn excite the phosphor layer to illuminate and light the cell. A visual image is hence displayed by on-and-off combinations of the individual cells of different colors.

Description is provided next of a method of manufacturing PDP 100 discussed above.

The front panel is constructed in a manner that "N" rows each of display electrodes 103 and display scan electrodes 104 are formed alternately in parallel to each other in a striped pattern on front glass substrate 101 (FIG. 2 shows only two rows each of them), the electrodes are then covered with dielectric glass layer 105, and MgO protective layer 106 is additionally formed on the surface of dielectric glass layer 105. Display electrodes 103 and display scan electrodes 104 are made of silver, and they are formed by coating a silver paste suitable for the electrodes with a screen printing method, and by firing them thereafter.

Dielectric glass layer 105 is formed into a predetermined thickness (approx. 20 μm) by coating a paste containing lead-oxide base or zinc-oxide base glass material using a screen printing method, followed by firing at a predetermined temperature for a predetermined time, for instance, at 560 deg-C. for 20 minutes. An example of materials suitable for the paste containing the lead base glass material is a chemical compound of PbO (70 wt %), $B_2O_3$ (15 wt %), $SiO_2$ (10 wt %) and $Al_2O_3$ (5 wt %) mixed in an organic binder (e.g., a solution of 10% ethyl cellulose in α-terpineol). The organic binder in this embodiment is a substance produced by dissolving a polymeric resin into organic solvent, and that other materials may also be used such as acrylic resin instead of ethyl cellulose as the resin material, and butyl-carbitol as the organic solvent. In addition, the organic binder may also be mixed with a dispersing agent such as glyceril trioleate. MgO protective layer 106 is made of magnesium oxide (MgO), and it is formed into a prescribed thickness (approx. 0.51 μm) by a sputtering method or a CVD method (i.e., chemical vapor deposition) for example.

The rear panel is constructed in a manner that "M" columns of address electrodes 107 are formed into a striped pattern on rear glass substrate 102, first by printing a silver paste suitable for the electrodes, and firing them thereafter. Dielectric glass layer 108 is formed over address electrodes 107 by coating a paste containing lead oxide base or zinc oxide base glass material using the screen printing method. In the like manner, barrier ribs 109 are formed by depositing a photosensitive paste containing lead oxide base or zinc oxide base glass material repeatedly at predetermined intervals by using the screen printing method, and firing them thereafter. These barrier ribs 109 divide discharge space 122 into a number of individual cells (unitary emissive areas) in one linear direction.

Figure 4:
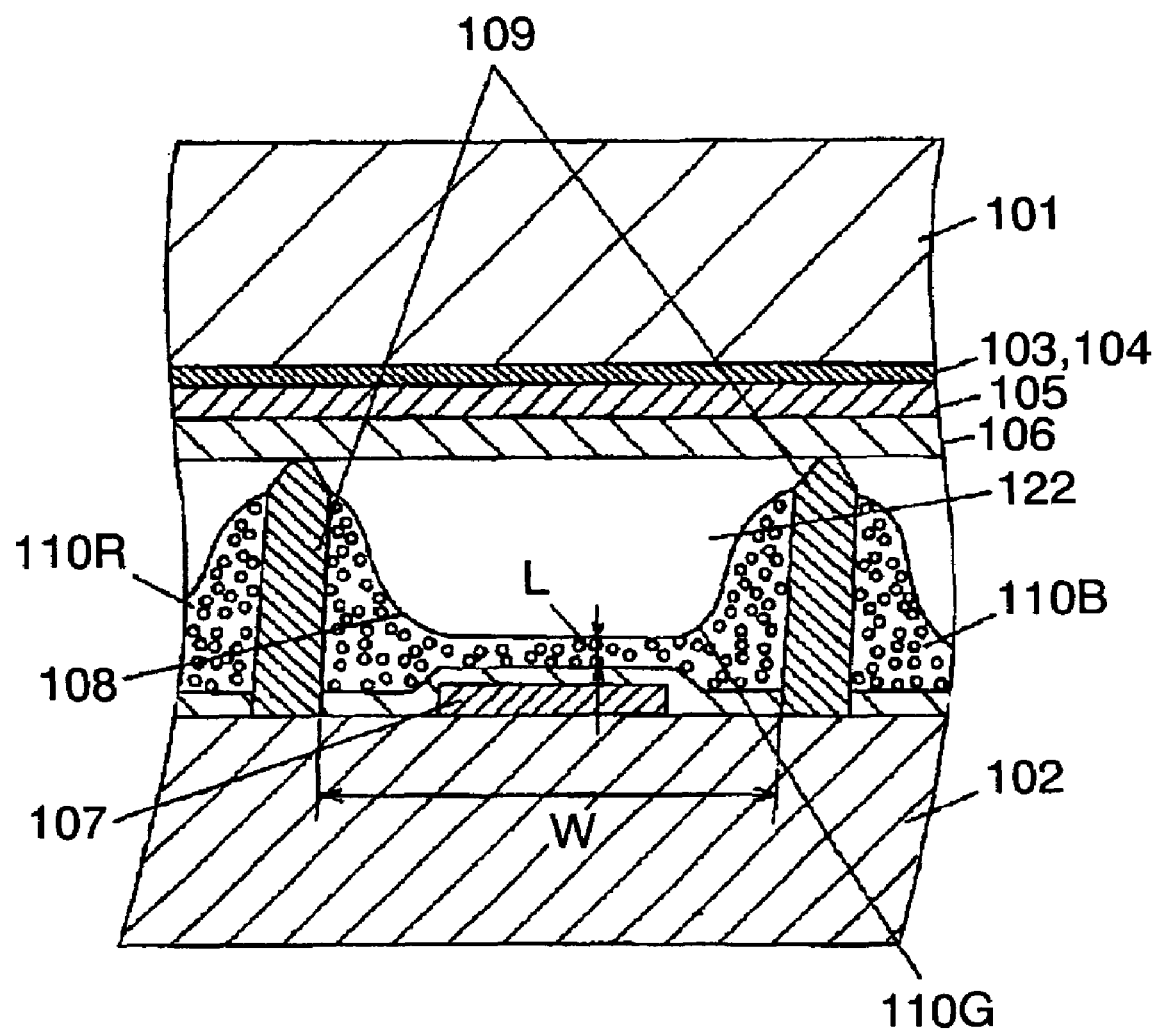
FIG. 4 is a cross sectional view depicting the structure of the image display area of the PDP for use in the plasma display device according to the exemplary embodiment of this invention.

FIG. 4 is a cross sectional view of PDP 100. Dimension "W" of the spaces formed by barrier ribs 109, as shown in FIG. 4, is fixed to a given value, or approx. 130 μpm to 240 μm, for example in the case of high-definition TV of 32 to 50 inch size. Inside the grooves between barrier ribs 109, there are phosphor layers formed of an yttrium oxide group red phosphor (R) of as red phosphor layers 110R, of which surfaces are charged positive (+), as well as phosphor layers formed of a blue phosphor (B) as blue phosphor layers 110B, of which surfaces are also charged positive (+). A material used for green phosphor layers 110G is a mixture of an aluminate group green phosphor containing aluminum, $MMg_{1-x}Al_{11}O_{19:Mnx}$, of which surface is charged positive (+), and any of aluminate group green phosphors containing yttria, $(Y_{1-a-y}Gd_a)BO_3Tb_y$, $(Y_{1-a-y}Gd_2)(Ga_{1-x}Al_x)_3(BO_3)_4$: $Tb_y$, $(Y_{1-a-y}Gd_a)(GA_{1-x}Al_x)_3(BO_3)_4$:$Ce_y$, $Tb_y$, $(Y_{1-a-y}Gd_a)_3$ $(Ga_{1-x}Al_x)_5O_{12}$:Tby and $MMg_{1-x}Al_{11}O_{19}$:$Ce_x$, $Tb_x$ of which surfaces are also charged positive (+).

These phosphor layers 110R, 110G and 110B are formed of phosphor inks of the individual colors made of color phosphor particles dissolved with organic binder into paste form, which are deposited on the inner surfaces of the barrier ribs, and fired at a temperature of approximately 500 deg-C. to burn off the organic binder and to firmly bind together the color phosphor particles. It is desirable to form these phosphor layers 110R, 110G and 110B so that thicknesses "L" of the layers deposited above address electrodes 107 becomes approximately 8 to 25 times the mean diameter of the phosphor particles of individual colors. In other words, it is desirable for the phosphor layers to have a thickness equal to at least 8 layers and preferably about 20 layers of the phosphor particles in order to ensure a sufficient brightness (i.e., emission efficiency) when ultraviolet rays of a given intensity are irradiated to these phosphor layers. This is because any thickness greater than the above value results in a virtual saturation of the emission efficiency of the phosphor layers, and deprives discharge spaces 122 of sufficient size.

The front panel and the rear panel produced as described above are placed together in a manner that the individual electrodes on the front panel cross at right angles with the address electrodes on the rear panel, and they are hermetically sealed by putting sealing frit throughout the perimeter of the panels and firing it at about 450 deg-C. for 15 minutes to form hermetic seal layer 121. After that, the interior of discharge space 122 is evacuated to a high vacuum of $1.1 \times 10^{-4}$ Pa, for instance, and filled with discharge gas comprising a mixture of inert gases such as He—Xe group, Ne—Xe group, He—Ne—Xe group and Ne—Kr—Xe group gases to a predetermined pressure (i.e., 50 to 80 kPa) with 5% or more in the partial pressure of Xe. PDP 100 is thus manufactured. This panel is completed after being subjected to an aging process for 5 hours under the conditions of 185V in discharge voltage and 200 kHz in discharge frequency.

Figure 5:
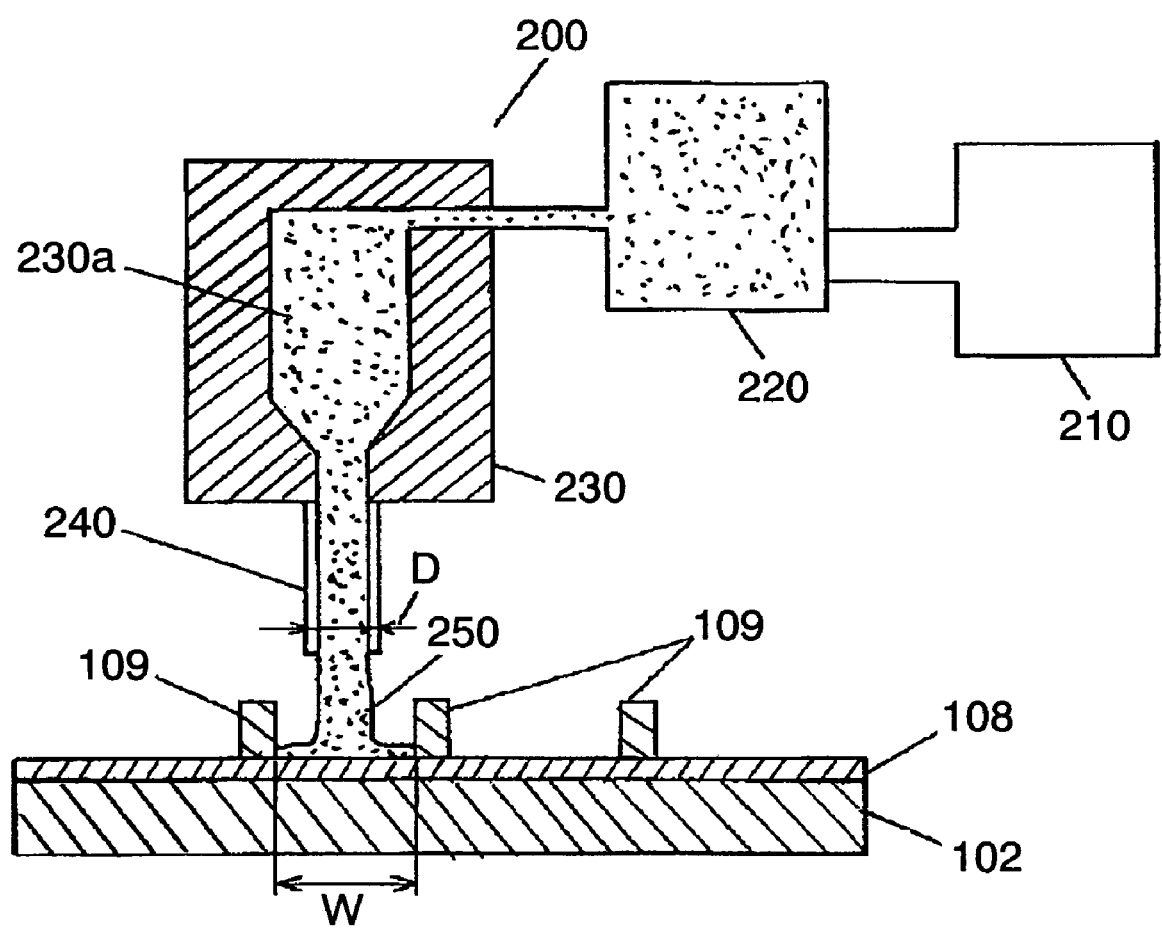
FIG. 5 is a schematic illustration of an ink application apparatus used for forming phosphor layers of the PDP.

FIG. 5 is a schematic illustration of ink application apparatus 200 used for forming phosphor layers 110R, 110G and 110B. Ink application apparatus 200 comprises server 210, pressure pump 220 and header 230, as shown in FIG. 5, wherein phosphor ink stored in and supplied from server 210 is pressurized by pressure pump 220 and delivered to header 230. Header 230 has ink chamber 230a and nozzle 240, and it is so constructed that the pressurized phosphor ink delivered to ink chamber 230a is ejected continuously from nozzle 240. It is desirable that nozzle 240 has aperture diameter "D" of at least 30 μm to prevent it from being clogged, but equal to or smaller than dimension "W" (approx. 130 μm to 200 μm) of the spaces between barrier ribs 109 so as to prevent the phosphor ink from flowing over the barrier ribs 109 during application, and it is hence designed normally to be 30 to 130 μm.

Header 230 is driven linearly by a header scanning mechanism, which is not shown in the figure, in such a manner that it continuously ejects phosphor ink 250 from nozzle 240 while being scanned, so that phosphor ink 250 is deposited uniformly throughout the grooves between barrier ribs 109 on rear glass substrate 102. The phosphor ink used here has its viscosity kept within a range of 1,500 to 50,000 CP at 25 deg-C.

The above server 210 is equipped with a stirring apparatus, though not shown in the figure, and the stirring apparatus prevents fine particles in the phosphor ink from precipitating. Header 230 is constructed integrally with ink chamber 230a and nozzle portion 240, and it is made of a metallic material by machining and fabrication with electrical discharge.

The method of forming the phosphor layers is not limited to the one discussed above, but many other methods can be used such as the photolithography, screen printing, a method of disposing a film containing mixture of phosphor particles, and the like.

The phosphor ink is the mixture of phosphor particles of each color with a binder and solvent, so prepared as to become 1,500 to 50,000 centipoise (CP). It may be added with a surface active agent, silica, dispersing agent (0.1 to 5 wt-%) and the like ingredients if necessary.

The red phosphor used for the mixture of this phosphor ink is one of suitable chemical compounds defined as $(Y, Gd)_{1-x}BO_3:Eu_x$ and $Y_{2-x}O_3:Eu_x$. They are such compounds in which a part of Y element ("yttrium") composing the host material is substituted by Eu ("europium"). It is desirable here that substituted value X of the Eu element for the Y element is arranged to be in a range of $0.05 \leq X \leq 0.20$. Any substituted value greater than that is considered not practically useful since it substantially accelerates degradation of the brightness although it initially increases the brightness. On the other hand, any value less than that is considered too low a composite ratio of Eu as the basic element of luminescence, and it becomes not suitable for the phosphor material because of low brightness.

A material used as the green phosphor is any of chemical compounds defined as $MMg_{1-x}Al_{11}O_{19}:Mn_x$ (where "M" denotes one of Ce and La, and a desirable range of "x" is $0.1 \leq x \leq 1.0$) having a magnetoplumbite crystal structure, yttria group compounds defined as $(Y_{1-a-y}Gd_a)BO_3:Tb_y$, $(Y_{1-a-y}Gd_a)(Ga_{1-x}Al_x)_3(BO_3)_4:Tb_y$, $(Y_{1-a-y}Gd_a)(Ga_{1-x}Al_x)_3(BO_3)_4:Ce_y, Tb_y$, $(Y_{1-y})_3(Ga_{1-x}Al_x)_5O_{12}:Tb_y$ and $LaMg_{1-x}Al_{11}O_{19}:Ce_x, Tb_x$, and a mixture of any of the above phosphors (more than one yttria group compound may be mixed). It is desirable here that substituted value "x" of Al for Ga, substituted value "a" of Gd for Y, and another substituted value "y" of Tb for Y are arranged to be within ranges of $0.1 \leq x \leq 1.0$, $0 \leq a \leq 0.9$ and $0.02 \leq y \leq 0.4$ respectively. It is also desirable that substituted value "x" of Ce and Tb for Mg is within a range of $0.01 \leq x \leq 0.1$.

A material used as the blue phosphor is any of chemical compounds defined as $Ba_{1-x}MgAl_{10}O_{17}:Eu_x$ and $Ba_{1-x-y}Sr_yMgAl_{10}O_{17}:Eu_x$. Both of $Ba_{1-x}MgAl_{10}O_{17}:Eu_x$ and $Ba_{1-x-y}Sr_yMgAl_{10}O_{17}:Eu_x$ are such compounds in which a part of Ba element composing the host material is substituted by Eu or Sr. It is desirable here that substituted value "X" of the Eu element for the Ba element and another substituted value "y" of the Sr element are within ranges of $0.03 \leq X \leq 0.2$ and $0.1 \leq y \leq 0.5$ respectively.

A method of synthesizing these phosphors will be described later. The binder to be mixed with the phosphor ink may be ethyl cellulose or acrylic resin (0.1 to 10 wt-% of the ink is mixed), and the solvent used for it can be a-terpineol or butyl-carbitol. Alternatively, polymers such as PMA and PVA may be used as the binder, and diethylene glycol and methylic ether may be used as the solvent.

In this exemplary embodiment, the phosphor particles used are manufactured by using any of solid phase firing method, aqueous solution method, atomized firing method and hydrothermal synthesizing method. Description is provided next of these methods of manufacturing the phosphor particles.

Described first pertains to the blue phosphor.

To start with, teaching is given of the blue phosphor of $Ba_{1-x}MgAl_{10}O_{17}:Eu_x$.

In the process of making a mixed solution, raw materials of barium nitrate, $Ba(NO_3)_2$, magnesium nitrate, $Mg(NO_3)_2$, aluminum nitrate, $Al(NO_3)_3$ and europium nitrate, $Eu(NO_3)_2$, are mixed to a mole ratio of 1-X:1:10:X (where $0.03 \leq X \leq 0.25$), and this mixture is dissolved in an aqueous medium to prepare a hydrated solution. Ion exchanged water and pure water are desirable for the aqueous medium because they do not contain impurities. However, any such water containing nonaqueous solvent (e.g., methanol, ethanol and the like) may still be useable.

Next, the hydrated solution is poured into a container made of a non-corrosive heat resistant material such as gold or platinum, and subjected to a hydrothermal synthesis (for 12 to 20 hours) under a predetermined temperature (100 to 300 deg-C.) and a predetermined pressure (0.2 to 10 MPa) in a pressurized vessel by using an apparatus capable of heating while pressurizing such as an autoclave, to synthesize the phosphor particles.

The fine particles are then fired at a predetermined temperature for a predetermined time (e.g., at 1,350 deg-C. for 2 hours) in a reducing atmosphere (e.g., in an ambience containing 5% hydrogen and 95% nitrogen), and the produced particles are classified to obtain the desired blue phosphor of $Ba_{1-x}MgAl_{10}O_{17}:Eu_x$. Next, the particles are annealed at 700 to 1,000 deg-C. in an oxygen and nitrogen atmosphere to transform a part of bivalent Eu into trivalent Eu, in order to remove oxygen defects and to reduce their surfaces that adsorb water and hydrocarbon gases.

The blue phosphor can also be made by the spray atomizing method in which the phosphor is synthesized by spraying the above hydrated solution into a high temperature furnace through a nozzle.

Description is provided next of the blue phosphor of $Ba_{1-x-y}Sr_yMgAl_{10}O_{17}:Eu_x$.

This phosphor is made by the solid phase reaction method in the same manner as the above $Ba_{1-x}MgAl_{10}O_{17}:Eu_x$, but only from different raw materials. Details of the raw materials used are described hereafter. The raw materials of barium hydroxide, $Ba(OH)_2$, strontium hydroxide, $Sr(OH)_2$, magnesium hydroxide, $Mg(OH)_2$, aluminum hydroxide, $Al(OH)_3$ and europium hydroxide, $Eu(OH)_2$, are weighed to the required mole ratio. These materials are mixed together with flux of $AlF_3$, and fired at a predetermined temperature (1,300 to 1,400 deg-C.) for a predetermined time (12 to 20 hours) to obtain phosphor particles of $Ba_{1-x-y}Sr_yMgAl_{10}O_{17}:Eu_x$ in which Mg and Al are substituted by tetravalent ions. This method can produce the phosphor particles having a mean particle diameter of approx. 0.1 to 3.0 μm.

The phosphor particles are then fired at 1,000 to 1,600 deg-C. for 2 hours in a reducing atmosphere containing 5% hydrogen and 95% nitrogen, for instance, and the produce is classified by using an air classifier to obtain fine phosphor particles. Finally, the particles are annealed at 700 to 1,000 deg-C. in an oxygen and nitrogen atmosphere to transform a part of bivalent Eu to trivalent Eu, in order to remove oxygen defects and to reduce their surfaces that adsorb water and hydrocarbon gases.

Although oxide compounds, nitrate compounds and hydroxide compounds are used mainly as the raw materials of the above phosphors, like phosphor can be produced by using organometallic compounds containing Ba, Sr, Mg, Al, Eu and the like, such as metal-alkoxide and acetylacetone.

Described next pertains to the green phosphors of $MMg_{1-x}Al_{11}O_{19}:Mn_x$ and $(Y_{1-a-y}Gd_y)(Ga_{1-x}Al_x)_3(BO_3)_4:Tb_y$.

To start with, description is given of the aluminate group compound of $MMg_{1-x}Al_{11}O_{19}:Mn_x$ having the magnetoplumbite crystal structure. Since the luminous material Mn is substituted by element Mg, this compound is expressed by the chemical formula of $M(Mg_{1-x} Mn_x) Al_{11}O_{19}$ (wherein M represents any of La and Ce). In the case of using the solid phase process, raw materials of lanthanum oxide, $La_2O_3$, cerium oxide, $Ce_2O_3$, magnesium oxide, MgO, aluminum oxide, $Al_2O_3$, and the luminous material of manganese carbonate, $MnCO_3$, are combined according to the required mole ratio of the oxide compounds and a predetermined "x" value, in a manner so that their composite becomes $M(Mg_{1-x} Mn_x) Al_{11}O_{19}$. The combined materials are then mixed with a small amount of flux ($AlF_3$ and $NH_4F$). Next, the mixture is fired at a temperature of 950 to 1,300 deg-C. for 2 hours in an air ambient. After the produce is crushed lightly to an extent that cohered lumps are loosened, it is fired at 900 to 1,200 deg-C. in an nitrogen atmosphere or nitrogen and hydrogen atmosphere. The produced particles are pulverized, and annealed at 500 to 900 deg-C. in an oxygen atmosphere or oxygen and nitrogen atmosphere in order to remove oxygen defects and to reduce their surfaces that adsorb water and hydrocarbon gases. The green phosphor which is charged positive is hence produced.

When producing yttrium group green phosphor, raw materials of yttrium oxide ($Y_2O_3$), gadolinium oxide ($Gd_2O_3$), gallium oxide ($Ga_2O_3$), aluminum oxide ($Al_2O_3$), boron oxide ($B_2O_3$) and the luminous material of terbium oxide ($Tb_2O_3$) are combined according to the composite ratio of the phosphor in the like manner as the aluminate group phosphor, and the combined material is fired at a temperature of 900 to 1,300 deg-C. for 4 hours in an air ambient after having mixed with a small amount of flux. Next, after the produce is crushed lightly to an extent that cohered lumps are loosened, it is fired at 900 to 1,200 deg-C. in an nitrogen atmosphere or nitrogen and hydrogen atmosphere, and the produced particles are again pulverized. Thereafter, the produced particles are annealed at 500 to 900 deg-C. in an oxygen atmosphere or oxygen and nitrogen atmosphere in order to remove oxygen defects and to reduce their surfaces that adsorb water and hydrocarbon gases. The green phosphor which is charged positive is hence produced.

Description is provided next of the red phosphor of $(Y, Gd)_{1-x}BO_3:Eu_x$.

In the process of making a mixed solution, raw materials of yttrium nitrate, $Y_2(NO_3)_3$, gadolinium nitrate, $Gd_2(NO_3)_3$, boric acid, $H_3BO_3$, and europium nitrate, $Eu_2(NO_3)_3$ are mixed to a mole ratio of 1-X:2:X (where $0.05 \leq X \leq 0.20$) as well as a ratio of 65:35 in the amount of Y and Gd elements. The mixed materials are then fired at 1,200 to 1,350 deg-C. for 2 hours in an air ambient, and classified to obtain the red phosphor. Since the red phosphor is fired in the air ambient, it contains comparatively small number of oxygen defects even if it is not annealed in an oxygen and nitrogen atmosphere. However, it is desirable to anneal it again because defects may develop in the process of classification.

Description is given next of the red phosphor Of $Y_{2-x}O_3:Eu_x$.

In the process of making a mixed solution, raw materials of yttrium nitrate, $Y_2(NO_3)_3$, and europium nitrate, $Eu_2(NO_3)_3$ are mixed and dissolved into ion exchanged water to make a mole ratio of 2-X:X (where $0.05 \leq X \leq 0.30$). Subsequently, in the process of hydration, a basic aqueous solution such as ammonia solution is added to this mixed solution to produce a hydrate. Thereafter, in the process of hydrothermal synthesis, the hydrate is poured together with ion exchanged water into a container made of a non-corrosive heat resistant material such as platinum or gold, and subjected to the hydrothermal synthesis for 3 to 12 hours under a temperature of 100 to 300 deg-C. and a pressure of 0.2 to 10 MPa in a pressurized vessel by using an autoclave, for instance. A resultant chemical compound is dried thereafter to obtain the desired phosphor of $Y_{2-x}O_3:Eu_x$.

Next, this phosphor is annealed at 1,300 to 1,400 deg-C. for 2 hours in the air ambient, and classified to complete the red phosphor. The phosphor obtained by this process of hydrothermal synthesis has particles of approximately 0.1 to 2.0 μm in diameter, and they become spherical in shape. These particle diameters and shapes are suitable to form a phosphor layer of outstanding light emitting property. The above red phosphors do not have many oxygen defects since they are fired in the air ambient, and amounts of adsorption of water and hydrocarbon gases are therefore very limited.

As described above, green phosphors used in this invention are the aluminate group green phosphor of $MM_{g1-x}Al_{11}O_{19}:Mn_x$ (where "M" represents any of La and Ce) of which surface is charged positive (+), and another group of green phosphors containing yttria, $(Y_{1-a-y}Gd_a)BO_3:Tb_y$, $(Y_{1-a-y}Gd_y)(Ga_{1-x}Al_x)_3(BO_3)_4:Ce_y$, $Tb_y$, $(Y_{1-a-y}Gd_a)_3(Ga_{1-x}Al_x)_5O_1$ and $LaMg_{1-x}Al_{11}O_{19}:Ce_x$, $Tb_x$ of which surfaces are also charged positive (+).

The conventional green phosphor of $Zn_2 SiO_4:Mn$, in particular, tends to clog the nozzle in the phosphor forming process, and it is liable to decrease the brightness when the green color is lit, since it is charged negative. However, the green phosphors according to this invention, when used, obviate clogging of the nozzle during the process of depositing the phosphors, eliminate color blur and degradation in the brightness of the panel as well as failures of address discharge, and they can hence improve brightness of the full-on white display.

A plasma display device of this invention was evaluated for its performances, as detailed below. A number of phosphor samples were prepared according to the above exemplary embodiment, PDP produced by using these samples were then assembled in the plasma display devices, and they were tested for this performance evaluation.

The individual plasma display devices produced here have a screen size of 42 inches (i.e., HD-TV specifications having rib pitches of 150 μm), dielectric glass layers of 20 μm thick, MgO protective layers of 0.5 μm thick, and intervals of 0.08 mm between the display electrodes and the display scan electrodes. In addition, their discharge spaces are filled with discharge gases consisting primarily of neon gas mixed with xenon gas in a ratio between 5% and 90% at a pressure of 66.5 kPa.

Table 1 is a list of combinations of the phosphor samples used for the individual PDP.

TABLE 1

| Sample No. | Type and Combination of Green Phosphor | Type of Blue Phosphor | Type of Red Phosphor |
|---|---|---|---|
| 1 | $LaMg_{1-x}Al_{11}O_{19}:Mn_x$ <br> x = 0.02 | $BaMgAl_{10}O_{17}:Eu$ | $(Y,Gd)BO_3:Eu$ |

TABLE 1-continued

| Sample No. | Type and Combination of Green Phosphor | Type of Blue Phosphor | Type of Red Phosphor |
|---|---|---|---|
| 2 | $LaMg_{1-x}Al_{11}O_{19}:Mn_x$<br>$x = 0.05$ | Same as above | Same as above |
| 3 | $LaMg_{1-x}Al_{11}O_{19}:Mn_x$<br>$x = 0.1$ | Same as above | Same as above |
| 4 | $CeMg_{1-x}Al_{11}O_{19}:Mn_x$<br>$x = 0.02$ | Same as above | Same as above |
| 5 | $LaMg_{1-x}Al_{11}O_{19}:Mn_x$<br>$x = 0.05$ | $(Ba,Sr)MgAl_{10}O_{17}:Eu$ | $Y_2O_3:Eu$ |
| 6 | $CeMg_{1-x}Al_{11}O_{19}:Mn_x$<br>$x = 0.1$ | Same as above | Same as above |
| 7 | Mixture of sample no. 1 and<br>$(Y_{1-a-y}Gd_a)(Ga_{1-x}Al_x)_3(BO_3)_4:Tb_y$<br>$a = 0, x = 0.1$ and $y = 0.02$<br>(mixing ratio of 45:55) | Same as above | Same as above |
| 8 | Mixture of sample no. 2 and<br>$(Y_{1-a-y}Gd_a)(Ga_{1-x}Al_x)_3(BO_3)_4:Tb_y$<br>$a = 0.5, x = 0.5$ and $y = 0.3$<br>(mixing ratio of 45:50) | Same as above | Same as above |
| 9 | Mixture of sample no. 3 and<br>$(Y_{1-a-y}Gd_a)(Ga_{1-x}Al_x)_3(BO_3)_4:Ce_y,$<br>$Tb_y, a = 0.9, x = 1$ and $y = 0.02$<br>(mixing ratio of 50:50) | Same as above | Same as above |
| 10 | Mixture of sample no. 4 and<br>$(Y_{1-a-y}Gd_a)(Ga_{1-x}Al_x)_3(BO_3)_4:Tb_y$<br>$a = 0, x = 1$ and $y = 0.4$<br>(mixing ratio of 40:60) | Same as above | Same as above |
| 11 | Mixture of sample no. 5 and<br>$LaMg_{1-x}Al_{11}O_{19}:Ce_x,Tb_x$<br>$x = 0.05$<br>(mixing ratio of 40:60) | Same as above | Same as above |
| 12 | Mixture of sample no. 6 and<br>$(Y_{1-y})_3(Ga_{1-x}Al_x)_5O_{12}:Tb_y$<br>$x = 1$ and $y = 0.03$<br>(mixing ratio of 30:60) | $BaMgAl_{10}O_{17}:Eu$ | $(Y,Gd)BO_3:Eu$ |
| 13 | Mixture of sample no. 4 and<br>$(Y_{1-a-y}Gd_a)BO_3:Tb_y$<br>$a = 0.5$ and $y = 0.03$<br>(mixing ratio of 40:60) | Same as above | Same as above |
| 14* | Mixture of $Zn_2SiO_4:Mn$ and<br>$(Y_{1-a-y}Gd_a)(Ga_{1-x}Al_x)_3BO_3:Tb_y$<br>$a = 0.5, x = 1$ and $y = 0.03$<br>(mixing ratio of 50:50) | Same as above | Same as above |
| 15* | Mixture of $BaAl_{12}O_{17}:Mn$ and<br>$(Y_{1-a-y}Gd_a)(Ga_{1-x}Al_x)_3BO_3:Tb_y$<br>$a = 0.5, x = 1$ and $y = 0.03$<br>(mixing ratio of 50:50) | Same as above | Same as above |
| 16* | $Zn_2SiO_4:Mn$ | Same as above | Same as above |
| 17* | $BaMgAl_{14}O_{23}:Mn, Eu$ | Same as above | Same as above |
| 18* | $BaAl_{12}O_{19}:Mn$ | Same as above | Same as above |
| 19* | Mixture of $BaAl_{12}O_{19}:Mn$ and $LaPO_4:Tb$ (mixing ratio of 50:50) | Same as above | Same as above |

*Sample numbers 14 to 19 are reference samples for comparison.

Phosphor particles used for samples 1 to 6 are one of aluminate group compounds M $(Mg_{1-x}Mn_x) Al_{11}O_{19}$ (where M represents any of La and Ce) as the green phosphors which are charged positive, one of $BaMgAl_{10}O_{17}:Eu$ and $(Ba,Sr) MgAl_{10}O_{17}:Eu$ as the blue phosphors, and one of $(Y,Gd) BO_3:Eu$ and $Y_2O_3:Eu$ as the red phosphors. Table 1 also shows values of "a" and "x", and kinds of the M element.

Phosphor particles used as the green phosphors of samples 7 to 10, 12 and 13 are a variety of mixed combinations between one of the aluminate group compounds $MMg_{1-x}Mn_xAl_{11}O_{19}:MN_x$ (where M represents any of La and Ce) and one of yttria group compounds $(Y_{1-a-y}Gd_a)$ $(Ga_{1-x}Al_x)_3(BO_3)_4:Tb_y$, $(T_{1-a-y}Gd_a)(Ga_{1-x}Al_x)_3(BO_3)_4:Ce_y,$ $Tb_y,$ and $(Y_{1-a-y}Gd_a)_3(Ga_{1-x}Al_x)_5O_{12}:Tb_y,$ $(Y_{1-a-y}Gd_a)(BO_3)$ $Tb_y,$ which are also charged positive. Phosphor particles also used are one of $(Ba,Sr) MgAl_{10}O_{17}:Eu$ and $Ba Mg Al_{10}O_{17}:Eu$ as the blue phosphors, and one of $Y_2O_3:Eu$ and $(Y, Gd) BO_3:Eu$ as the red phosphors. Table 1 also shows individual values of "a", "x", and "y", and kinds of the M element.

Phosphor particles used for sample 11 are a mixed combination of the aluminate group compound $LaMg_{1-x}Al_{11}O_{19}:$ $Mn_x$ (where M represents any of La and Ce) and the magnetoplumbite group compound $La Mg_{1-x}Al_{11}O_{19}:Ce_x,$ $Tb_x$ as the green phosphor, which are charged positive, $(Ba,Sr) MgAl_{10}O_{17}:Eu$ as the blue phosphor, and $Y_2O_3:Eu$ as the red phosphor. Table 1 also shows individual values of "x" and a kind of the M element.

The green phosphors of samples 14 to 19 for the comparison purpose are phosphor materials, each containing any one of the conventional chemical compound $Zn_2 Si O_4:Mn,$ B-alumina crystal compounds $BaAl_{12}O_{17}:Mn$ and $BaMgAl_{14}O_{23}$:Eu, Mn, and phosphoric acid compound $LaPO_4$:Tb, all of which are charged negative (−). These samples also use the blue phosphor of $BaMgAl_{10}O_{17}$:Eu, and the red phosphor of (Y, Gd) $BO_3$:Eu. Table 1 shows compositions of the individual phosphors.

The following experiments were conducted on those samples.

EXPERIMENT 1

Amounts of electric charges were measured on the green phosphors of the produced samples 1 through 13 and the reference samples 14 through 19 by using a blow-off method, which can check the amounts of charges on reduced iron powder (Refer to Journal of The Illuminating Engineering Institute of Japan, Vol. 76, No. 10, published in 1992, PP 16-27). As a result, it became clear that all of the samples carry positive charges, except for the samples 14 and 16 which contain $Zn_2SiO_4$:Mn, and they therefore carry negative charges.

EXPERIMENT 2

The phosphors (i.e., blue, green and red colors) in the produced panels were taken out, and amounts of adsorbed water, CO, $CO_2$ and hydrocarbon were measured by the TDS (i.e., Temperature-programmed desorption gaseity amount analysis method). For the test specimens, 100 milligrams (mg) each of the phosphors were taken from inside of the produced panels, they were heated from the room temperature to 600 deg-C., and gross weights of escaped water and hydrocarbon group gases were measured. Amounts of the water and hydrocarbon group gases of the samples 2 to 19 were compared in relation to amounts of the water and hydrocarbon group gases of the sample 1, which were reckoned at 1 and used as the base values.

EXPERIMENT 3

Brightness (in full-on white, green, blue and red colors) and color temperatures of the panels were measured by using a luminance meter right after completion of the manufacturing process.

EXPERIMENT 4

In the measurements of degradation in the brightness and color temperatures of the panels when lit to the full-on white screen, the PDP were impressed continuously with discharge sustaining pulses of 185V and 200 kHz in voltage and frequency for 1,000 hours, and the brightness and color temperatures were measured before and after the operation. Rates of change in brightness degradation (i.e., [(brightness after the operation−brightness before the operation)/brightness before the operation]×100) and rates of change in color temperatures were obtained from the above results. In determining address error during address discharges, display images were examined for presence or absence of flickers, and an error was determined exist even when there was only one.

Table 2 shows results of the above experiments 1 through 4 on the rates of change in the brightness degradation of the green color as well as the full-on white screen, and also presence and absence of the address error.

TABLE 2

| Sample No. | Ratio of water & hydrocarbon adsorbed in phosphors (in 100 mg) as compared to basic sample no. 1 | | Rate of change in brightness of panel (%), after 1000 hours of sustaining discharge in full-white screen with 185 V, 200 kHz | | | | Rate of change in brightness of green color (%), after 1000 hour application of discharge sustaining pulses of 185 V, 200 kHz | | | | Presence of address error in address discharge and clogging of nozzle | | | |
|---|---|---|---|---|---|---|---|---|---|---|---|---|---|---|
| | Water | Hydrocarbon | Xe 5% | Xe 10% | Xe 20% | Xe 60% | Xe 5% | Xe 10% | Xe 20% | Xe 60% | Xe 5% | Xe 10% | Xe 20% | Xe 60% |
| 1 | 1 | 1 | −2.1 | −2.2 | −2 | −2.2 | −1.9 | −2 | −1.8 | −2 | none | none | none | none |
| 2 | 0.8 | 0.7 | −2 | −1.9 | −2 | −2.1 | −1.8 | −1.7 | −1.8 | −1.9 | none | none | none | none |
| 3 | 0.6 | 0.5 | −1.8 | −1.7 | −1.6 | −1.8 | −1.6 | −1.5 | −1.4 | −1.6 | none | none | none | none |
| 4 | 1.1 | 1.2 | −2.3 | −2.4 | −2.2 | −2.4 | −2 | −2.1 | −1.9 | −2.2 | none | none | none | none |
| 5 | 0.9 | 0.8 | −2 | −2.1 | −2 | −2.1 | −1.8 | −1.9 | −1.7 | −1.8 | none | none | none | none |
| 6 | 0.6 | 0.5 | −1.6 | −1.7 | −1.6 | −1.7 | −1.5 | −1.4 | −1.3 | −1.6 | none | none | none | none |
| 7 | 0.8 | 0.7 | −1.8 | −1.9 | −1.8 | −1.8 | −1.5 | −1.7 | −1.5 | −1.6 | none | none | none | none |
| 8 | 0.8 | 0.7 | −1.7 | −1.8 | −1.9 | −1.7 | −1.4 | −1.5 | −1.6 | −1.5 | none | none | none | none |
| 9 | 0.5 | 0.4 | −1.5 | −1.4 | −1.4 | −1.5 | −1.3 | −1.2 | −1.3 | −1.4 | none | none | none | none |
| 10 | 0.8 | 0.7 | −2 | −2.1 | −2.2 | −2 | −1.8 | −1.9 | −1.8 | −1.7 | none | none | none | none |
| 11 | 0.6 | 0.6 | −1.8 | −1.9 | −1.7 | −1.7 | −1.6 | −1.6 | −1.5 | −1.6 | none | none | none | none |
| 12 | 0.4 | 0.4 | −1.3 | −1.4 | −1.3 | −1.5 | −1.1 | −1.2 | −1.2 | −1.3 | none | none | none | none |
| 13 | 0.7 | 0.8 | −1.7 | −1.8 | −1.9 | −1.8 | −1.6 | −1.6 | −1.7 | −1.5 | none | none | none | none |
| 14* | 2.7 | 2.7 | −4.1 | −4 | −3.8 | −3.5 | −4 | −2.8 | −3.5 | −3.3 | yes | yes | yes | yes |
| 15* | 2.8 | 2.7 | −4.6 | −4.5 | −4.3 | −4.1 | −4.3 | −4.2 | −4.1 | −3.9 | none | none | none | none |
| 16* | 3.2 | 3.1 | −4.8 | −4.6 | −4.7 | −4.5 | −4.5 | −4.3 | −4.6 | −4.2 | yes | none | none | none |
| 17* | 3.8 | 3.9 | −5.4 | −5.3 | −5.3 | −5.2 | −5.2 | −5 | −5.1 | −5.1 | none | none | none | none |
| 18* | 4.8 | 5 | −5.9 | −5.6 | −5.5 | −5.1 | −5.5 | −5.2 | −5 | −5 | none | none | none | none |
| 19* | 4.4 | 4.2 | −5.1 | −5.2 | −5.3 | −5 | −4.9 | −5 | −5.1 | −4.8 | none | none | none | none |

*Sample numbers 14 to 19 are reference samples for comparison.

As shown in Table 1, the green phosphors provided in the reference samples 14 through 19 are a mixture of $Zn_2SiO_4$:Mn and (Y, Gd) $BO_3$:Tb for the sample 14, a mixture of Ba $Al_{12}O_{19}$:Mn and (Y, Gd)$BO_3$ for the sample 15, $Zn_2SiO_4$:Mn for the sample 16, Ba Mg $Al_{14}$ $O_{23}$:Eu, Mn for the sample 17, Ba $Al_{12}O_{19}$:Mn for the sample 18, and a mixture of Ba $Al_{12}O_{17}$:Mn and La $PO_4$:Tb for the sample 19, and the blue phosphors provided are $BaSrMgAl_{10}O_{17}$:Eu for all of them. Therefore, large amounts of water and hydrocarbon gases were adsorbed by these phosphors. The amounts of adsorbed water, in particular, were 2 to 5 times as large as compared to those of the embodied samples of this invention. The amounts of hydrocarbon gases were also larger by 2 to 3 times, although absolute amounts of them are ⅕ to ⅒ of the water.

For this reason, the reference samples 14 to 19 showed substantial decrease in brightness of the green and blue colors during the discharging operation, and many address errors were recorded especially when the partial pressure of Xe gas exceeds 10%. Since samples 14 and 16, in particular, use $Zn_2$ $SiO_4$:Mn for the green phosphors, they adsorbed large amounts of water and hydrocarbon group gases, and exhibited especially large numbers of address errors and substantial degradation in the brightness attributable to the ultraviolet rays (in 147 nm) and the discharge sustaining pulses.

In addition, since samples 17, 18 and 19 use the green phosphors of one of $BaMgAl_{14}O_{23}$:Mn, Eu, $BaAl_{12}O_{19}$:Mn, $LaPO_4$:Tb and the like, which are liable to adsorb water and hydrocarbon gases, they show especially large numbers of address errors and degradation due to the discharging operation.

To this contrary, all of the panels having the green, blue and red color combinations of samples 1 to 13 showed only small degrees of change in the brightness of the individual colors attributable to the ultraviolet rays (in 147 nm) and the discharge sustaining pulses, and they did not exhibit any reduction in the color temperature, address errors, and clogging of the nozzle in the process of depositing the phosphors. This is because they use the green phosphors made of any one or a mixed combination of the compound M $(Mg_{1-x}Mn_x) Al_{11} O_{19}$ having the magnetoplumbite crystal structure containing aluminum, and any of compounds $(Y_{1-a-y}Gd_a)(Ga_{1-x}Al_x)_3(BO_3)_4$:$TB_y$, $(Y_{1-a-y}GD_a)(Ga_{1-x}Al_x)_3(BO_3)_4$:$Ce_y$,$Tb_y$, $(Y_{1-a-y}Gd_a)_3(Ga_{1-x}Al_x)_5O_{12}$:$Tb_y$, $(Y_{1-a-y}Gd_a)BO_3$:$Tb_y$, and La $Mg_{1-x}Al_{11} O_{19} Ce_x$, $Tb_x$ containing Y or Al elements, instead of the conventional green phosphors which are liable to adsorb water and hydrocarbon. In other words, they restrict release of the water and hydrocarbon inside the panels, and prevent degradation in the brightness due to the discharge and address errors attributable to the deterioration of MgO.

INDUSTRIAL APPLICABILITY

According to the present invention as described above, the phosphor crystals of the individual colors are composed of such chemical compounds that carry positive charges. In particular, the green phosphor layers are made of the aluminate group phosphor particles having the magnetoplumbite crystal structure and the yttria group phosphor particles which do not adsorb large amounts of moisture and hydrocarbon, and have large coefficient of electron emission. The invention can hence provide the highly reliable panel with small degradation in the brightness and color temperature without causing address errors even when a partial pressure of the Xe gas inside the panel rises, and it is therefore useful for a display device of large screen.

The invention claimed is:

1. A plasma display device provided with a plasma display panel comprising a plurality of columns of discharge cells having one of a single color and multiple colors, and a phosphor layer disposed in each of the discharge cells, the phosphor layer having a color corresponding to the each discharge cell for emitting light when excited by ultraviolet rays, wherein the phosphor layer includes a green color phosphor comprising a mixture of a phosphor material defined by a general formula of $MMg_{1-x}Al_{11}O_{19}$:$Mn_x$ (where M denotes one of La and Ce) and one of phosphor materials defined by general formulae of $(Y_{1-a-y}Gd_a)(Ga_{1-x}Al_x)_3(BO_3)_4$:$Tb_y$, and $(Y_{1-a-y}Gd_a)(Ga_{1-x}Al_x)_3BO_3)_4$:$Ce_y$,$Tb_y$.

2. The plasma display device according to claim 1, wherein the value of x in the general formula of $MMg_{1-x}Al_{11}O_{19}$:$Mn_x$ is within a range of $0.01 \leq x \leq 0.1$.

3. The plasma display device according to claim 2, wherein the values of x, a, and y in the general formulae of $(Y_{1-a-y}Gd_a)(Ga_{1-x}Al_x)_3(BO_3)_4$:$Tb_y$ and $(Y_{1-a-y}Gd_a)(Ga_{1-x}Al_x)_3(BO_3)_4$:$Ce_y$, $Tb_y$ are within the ranges $0.1 \leq x \leq 1.0$; $0 \leq a \leq 0.9$; and $0.02 \leq y \leq 0.4$.

4. The plasma display device according to claim 3, wherein the phosphor layer additionally comprises a blue color phosphor and a red color phosphor, the blue color phosphor comprises one of phosphor materials defined by general formulae of $Ba_{1-x}MgAl_{10}O_{17}$:$Eu_x$ and $Ba_{1-x-y}Sr_yMgAl_{10}O_{17}$:$Eu_x$, wherein x is within the range of $0.03 \leq x \leq 0.2$, and y is within the range $0.1 \leq y \leq 0.5$, and the red color phosphor comprises one of phosphor materials defined by general formulae of $Y_{2-x}O_3$:$Eu_x$ and $(Y, Gd)_{1-x}BO_3$:$Eu_x$, wherein x is within the range $0.05 \leq x \leq 0.20$.

5. The plasma display device according to claim 1, wherein the phosphor layer additionally comprises a blue color phosphor and a red color phosphor, and the blue color phosphor and the red color phosphor are each positively charged.

6. The plasma display device according to claim 5, wherein the value of x in the general formula of $MMg_{1-x}Al_{11}O_{19}$:$Mn_x$ is within a range of $0.01 \leq x \leq 0.01$, and the values of x, a, and y in the formula general formulae of $(Y_{1-a-y}Gd_a)(Ga_{1-x}Al_x)_3(BO_3)_4$:$Tb_y$ and $(Y_{1-a-y}Gd_a)(Ga_{1-x}Al_x)_3(BO_3)_4$:$Ce_y$, $Tb_y$ are within the ranges $0.1 \leq x \leq 1.0$; $0 \leq a \leq 0.9$; and $0.02 \leq y \leq 0.4$.

* * * * *

UNITED STATES PATENT AND TRADEMARK OFFICE
CERTIFICATE OF CORRECTION

PATENT NO. : 7,268,492 B2
APPLICATION NO. : 10/534398
DATED : September 11, 2007
INVENTOR(S) : Yoshinori Tanaka et al.

Page 1 of 1

It is certified that error appears in the above-identified patent and that said Letters Patent is hereby corrected as shown below:

At column 16, line 52, "range of $0.01 \leq x \leq 0.01$" should read --range of $0.01 \leq x \leq 0.1$--.

Signed and Sealed this

Third Day of June, 2008

JON W. DUDAS
*Director of the United States Patent and Trademark Office*